United States Patent Office 3,592,865
Patented July 13, 1971

3,592,865
SEPARATION AND RECOVERY OF COMPLEXIBLE LIGANDS BY LIQUID EXCHANGE
Robert B. Long, Atlantic Highlands, John P. Longwell, Westfield, and Fred A. Caruso, Elizabeth, N.J., and Richard J. DeFeo, Baton Rouge, La., assignors to Esso Research and Engineering Company
Filed Sept. 3, 1968, Ser. No. 756,925
Int. Cl. C07c 7/00, 11/00; B01j 11/22
U.S. Cl. 260—677A  39 Claims

ABSTRACT OF THE DISCLOSURE

Complexible ligands contained in a feed stream are complexed with a liquid sorbent solution of cuprous aluminum halide. The complexed complexible ligands are then separated by a ligand exchange operations generally requiring $n-1$ ligand exchange operations for $n$ complexed complexible ligands to be separated. The separation in each ligand exchange operation is effected by contacting the several complexed complexible ligands with a stripping ligand which forms a more stable complex with the sorbent than the complexible ligand or ligands to be separated and recovered, and exchanging the stripping ligand for the complexible ligand or ligands in the sorbent complex.

FIELD OF THE INVENTION

This invention relates to the separation and recovery of complexible ligands, e.g., unsaturated hydrocarbons such as olefins and acetylenes, and carbon monoxide. More particularly, this invention relates to the separation of complexible ligands contained in a feed stream by contacting the feed stream with a cuprous aluminum halide sorbent contained in a liquid aromatic solution. Still more particularly, this invention relates to a ligand exchange process wherein complexed complexible ligands are contacted wth a stripping ligand which forms a complex with the sorbent more stable than the complexible ligand or ligands to be recovered, thereby exchanging with the ligand or ligands to be recovered and producing the ligand or ligands in a substantially pure form.

PRIOR ART

In copending application Ser. No. 805,912 filed of an even date herewith, cuprous aluminum halide sorbents capable of sorbing, i.e., complexing, a wide variety of unsaturated ligands are disclosed. These sorbents can be used as solids, liquids, or in slurries and the complexing ligand may be contacted with the sorbent as either a liquid or a gaseous stream. Generally, sorbents whether of the bimetallic type as disclosed herein or of the single metal type, e.g., CuCl, are utilized to complex and separate ligands in one of two ways, that is, (1) a feed stream containing only one complexible ligand is contacted with the sorbent and, therefore, only one ligand is sorbed and subsequently separated; (2) a feed stream containing several complexible ligands is contacted with the sorbent, all ligands are sorbed and either fractionally decomplexed, i.e., by heating at various decomplexing temperatures corresponding to individual ligand-sorbent complex dissociation pressures, or total decomplexing followed by conventional separation, e.g., distillation, techniques. While such processes have achieved some success, they generally cannot be used to purify, as well as separate, the various complexible ligands. However, by virtue of the present invention it is now possible to separate ligands and produce them in purities in excess of 99% regardless of the ligand or ligands complexed.

SUMMARY OF THE INVENTION

In accordance with this invention, therefore, complexible ligands contained in a suitable feed stream are contacted with a liquid sorbent comprised of cuprous aluminum halide, e.g., fluoride, chloride, bromide, iodide, preferably chloride or bromide, more preferably chloride, whereby all or substantially all of the complexible ligands are complexed by the sorbent, one or more of the complexed complexible ligands being recovered by a ligand exchange process wherein a stripping ligand which is also a complexible ligand and preferably forms a more stable complex with the sorbent than the ligand or ligands to be recovered is contacted with the complex of complexible ligands, thereby displacing, i.e., exchanging with, the ligand or ligands to be recovered in the complex. The exchange process is then continued with increasingly more stable complex-forming stripping ligands until all of the complexed complexible ligands have been recovered and the only complex that remains is that of the sorbent and the most stable complex-forming ligand. This complex is then easily decomplexed by increasing temperatures and/ or lowering pressures. In a preferred embodiment, the decomplexing operation is conducted in the presence of an excess of an extraneous halide in the final decomplexing zone to inhibit deleterious side reactions.

To illustrate such a process, consider the feed stream that contains complexible ligands A, B, and C (listed in ascending order of the stability of their complexes) which is contacted with a cuprous aluminum halide ($CuAlX_4$) sorbent accordingly:

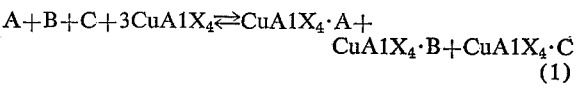

$$A+B+C+3CuAlX_4 \rightleftharpoons CuAlX_4 \cdot A + CuAlX_4 \cdot B + CuAlX_4 \cdot C \quad (1)$$

whereby all of the complexible ligands in the feed are complexed. Now, if it is desired to separately recover A, B, and C in high purities, in accordance with this invention, the most direct method would be to contact the complexed complexible ligands first with B (which is a more stable complex former than A) and then with C (which is a more stable complex former than B) accordingly:

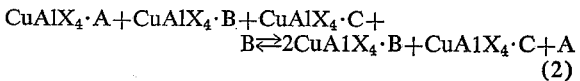

$$CuAlX_4 \cdot A + CuAlX_4 \cdot B + CuAlX_4 \cdot C + B \rightleftharpoons 2CuAlX_4 \cdot B + CuAlX_4 \cdot C + A \quad (2)$$

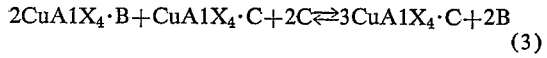

$$2CuAlX_4 \cdot B + CuAlX_4 \cdot C + 2C \rightleftharpoons 3CuAlX_4 \cdot C + 2B \quad (3)$$

and the remaining complex is easily decomplexed by

$$CuAlX_4 \cdot C + \text{heat} \rightleftharpoons CuAlX_4 + C \quad (4)$$

It is not absolutely necessary, however, to contact, in Equation 2, the complexes with B but another ligand having greater complex stability than A but less complex stability than C could also be used when it is desired to recover pure A. Of course, it will be readily apparent from the foregoing equations that any number of ligands may be selectively displacing from the complex, for example, in the equations shown by contacting the complex initially with ligand C the following reaction will occur

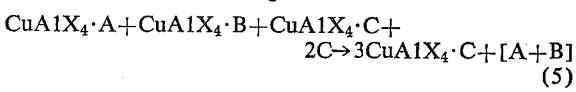

$$CuAlX_4 \cdot A + CuAlX_4 \cdot B + CuAlX_4 \cdot C + 2C \rightarrow 3CuAlX_4 \cdot C + [A+B] \quad (5)$$

and a pure mixture of B and C can be recovered, for example, to recover ethylene and propylene for copolymerization. Additionally, the ultimate complex, i.e., that containing the last remaining ligand, can also be displaced by a more stable complex forming ligand but, since it is generally desirable to be able to use the sorbent for addi-

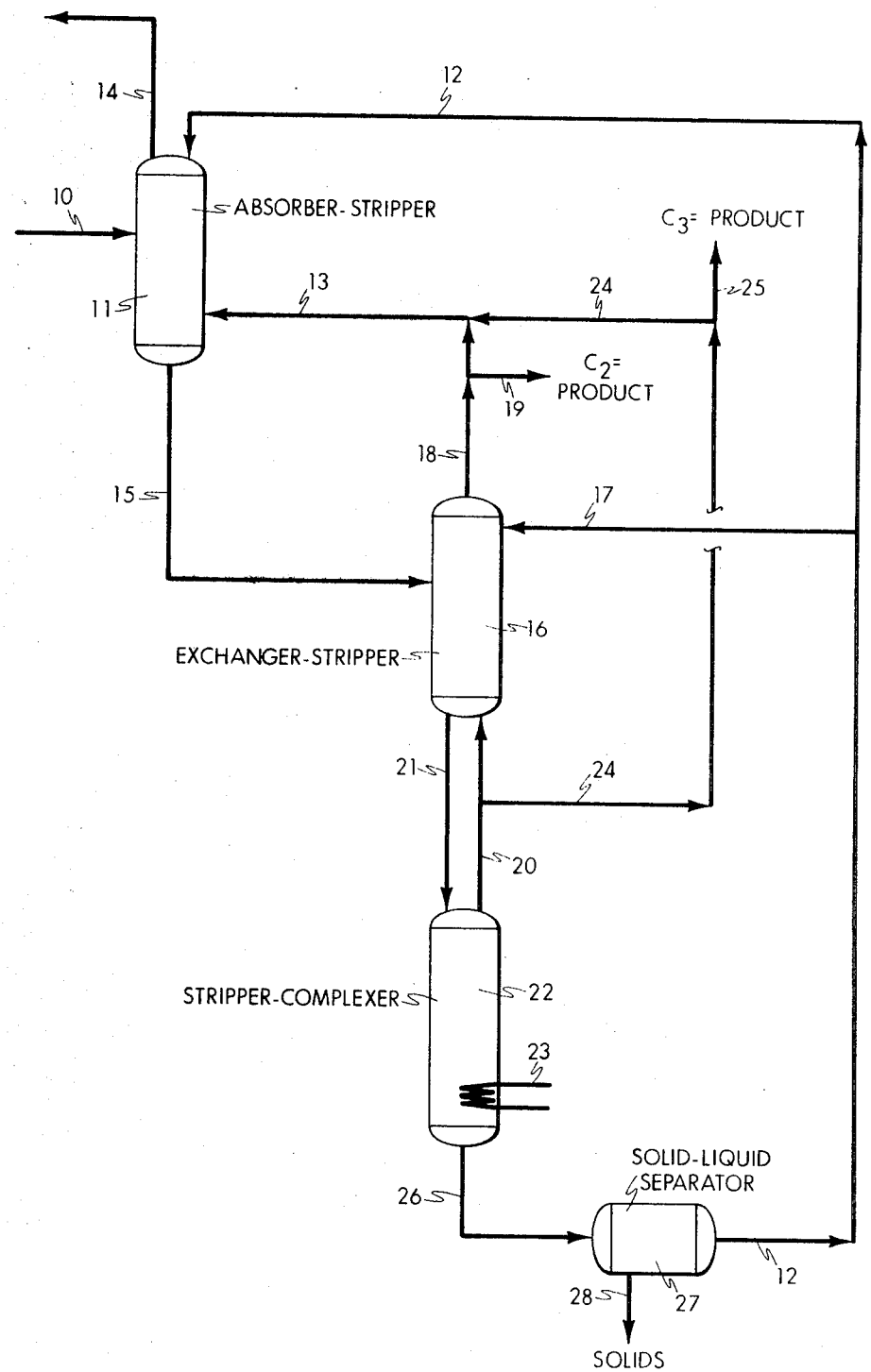

+300° F., preferably 0° to 150° F. while pressures of 0.5 to 100 atmospheres, preferably 1 to 200 atmospheres can be employed. Decomplexing to recover and/or regenerate the most stable complex-forming ligand can be effected at temperatures higher than that for complexing that ligand (at constant pressures) and in the range of about 50° F. to 500° F., preferably 200° F. to 400° F., or at pressures lower than that for complexing that ligand (at constant temperature) and in the range of about 0.1 to 30 atmospheres, preferably 0.5 to 20 atmospheres.

Feed streams containing complexible ligands which may be separated and purified by this process can be obtained from steam cracking light ends, dehydrogenation processes, e.g., butane to butenes and butadiene, catalytic cracking light ends, wax cracking processes, etc. Of course, any feed stream having at least two complexible ligands contained therein can utilize the advantages described herein.

PREFERRED EMBODIMENT

In a preferred embodiment of the invention described herein ethylene and propylene are separately recovered from a feed stream as may be obtained from the light ends section of a conventional steam cracking unit. Such a feed stream from which acetylene and carbon monoxide have previously been removed, e.g., by cuprous ammonium acetate complexing and conventional carbon monoxide absorption, contains methane, ethane, propane, and hydrogen in addition to the desirable ethylene and propylene ligands. These desirable ligands can be recovered in purities exceeding 95%, preferably exceeding 99%, by the process of this invention.

DRAWING DESCRIPTION

A better understanding of the preferred embodiment hereof will be had by reference to the attached drawing. This drawing shows a typical processing plan for the recovery of ethylene and propylene in exceedingly high purity. Turning now to the drawing, feed comprising hydrogen, methane, ethane, propane, ethylene, and propylene is introduced into absorber-stripper 11 by line 10 where it is contacted with a liquid phase sorbent of cuprous aluminum chloride and an aromatic, such as toluene, e.g., the sorbent is $CuAlCl_4 \cdot (toluene)_2$, from line 12. Ligand exchange is effected in absorber-stripper 11 since ethylene and propylene, the major complexible ligands, both form more stable complexes with the cuprous aluminum chloride than does the toluene. Consequently, the effluent from the absorber-stripper contained in line 15 is comprised of two complexes, i.e., $CuAlCl_4 \cdot (C_2H_4)_2$ and $CuAlCl_4 \cdot (C_3H_6)_2$, and free toluene. A stripping gas, contained in line 13, is utilized to entrain the uncomplexed feed, i.e., hydrogen, methane, ethane, and propane, which is swept out of the absorber-stripper in line 14. The stripping gas can be any inert material, such as nitrogen, helium, etc., but preferably the stripping gas is a portion of the pure ethylene and propylene recovered in the process. More preferably, the stripping gas containing ethylene and propylene is introduced into the absorber-stripper in a concentration in equilibrium with the ethylene and propylene complexes leaving the absorber-stripper so as to prevent ligand exchange between the ethylene and propylene complexes and the consequent displacement of ethylene by the propylene or of propylene by the ethylene. This helps assure that the ethylene/propylene ratio in the complex leaving the bottom of tower 11 is the same as that in the feed and thus recovery of both ligands is maximized at the same time. Now the ethylene complex, propylene complex and free toluene in line 15 are introduced into exchange-stripper 16 and contacted therein with propylene in line 20. Ligand exchange again occurs, this time between the propylene coming from line 20 and the ethylene complex (propylene forming a more stable complex with $CuAlCl_4$ than ethylene and, therefore, displacing the ethylene). Pure ethylene displaced from the complex comes overhead in line 18, a portion going to product recovery by line 19 and a portion being utilized for stripping gas by line 13. In order to produce a high purity ethylene, a stream of sorbent in line 17 is introduced into exchange-stripper 16 and the ethylene displaced in the ligand exchange process is recomplexed and falls downwardly to be displaced by the incoming propylene. The sorbent in line 17 acts similarly as a reflux and with increasing sorbent addition, i.e., increased recomplexing, the ethylene purity recovered overhead is increased. The propylene complex and free toluene remaining is recovered in line 21 and is sent to stripper-decomplexer 22 where heating means 23 can be utilized to decomplex the propylene complex and thereby strip the propylene out of the complex for recovery in line 20. A portion of the recovered propylene is utilized to strip out ethylene in exchanger-stripper 16, the remaining propylene being taken in line 24, another portion being taken as propylene product by line 25 and the last portion mixed with ethylene in line 13 for use as stripping gas in absorber-stripper 11. The cuprous aluminum chloride and free toluene remaining are recovered in line 26 and passed to liquid-solid separator 27, e.g., filter, hydroclone, etc., where fines, e.g., olefin-salt residues can be removed in line 28. The salt and toluene then recomplex to form liquid sorbent in line 12 and is recycled to the process.

The foregoing drawing description illustrates a process whereby two complexible ligands are separately recovered using one exchange-stripper. Thus, the general rule that $n+1$ components can be separated using $n$ exchange-strippers is satisfied. To further illustrate, the feed stream in line 10 might also contain acetylene and carbon monoxide, both of which are also complexible ligands, and, therefore, four complexible ligands would be present and three exchanger-strippers would be required. Now, following the general consideration that the least stable ligand is stripped and removed first and the fact that the order of stability of these ligands with the cuprous aluminum chloride is propylene>ethylene>acetylene>carbon monoxide the separation of these components in high purity can be easily envisioned by a process similar to that described above. Thus, the feed stream is contacted with liquid sorbent sufficient to complex all of the complexible ligands contained therein. The stripping gas can be a mixture of the complexible ligands or propylene alone. In the first exchanger-stripper acetylene is used as the stripping gas and exchanges with carbon monoxide which is recovered in a high purity overhead. In the second exchanger-stripper ethylene is used as the stripping gas and exchanges with acetylene which is recovered in a high purity overhead. The bottoms product from the second exchanger-stripper is then identical with the product leaving absorber-stripper 11 in the drawing above and the same procedure is then followed as outlined above. Sorbent for recomplexing can be used in each of the exchanger-strippers for increasing the purity of the recovered overhead product from each of the exchanger-strippers.

In yet another preferred embodiment of this invention, deleterious side reactions which may occur in the stripper-decomplexer, particularly when light olefins are to be removed by decomplexation, e.g., such as $C_3^+$ olefins, can be eliminated. These side reactions generally involve the polymerization of the light olefin to be removed or alkylation of the aromatic by the light olefin and are believed to be due to the catalytic activity of the aluminum halide present in the bimetallic salt sorbent. For example, aluminum chloride is a well-known Friedel-Crafts catalyst and is strongly acidic, enough so as to promote the polymerization of light olefins. These deleterious side reactions are further promoted by the necessarily high temperatures required to decomplex the relatively stable complexes formed by the light olefin. Thus, the consequent combination of residual catalytic activity of the bimetallic salt and high decomplexing temperatures can cause some recovery problems and loss of product in the decomplexing zone. Nevertheless, these difficulties can be overcome by various techniques such as operating the decomplexing zone under vacuum conditions, thereby reducing the decomplexing temperature for the complex being handled and reducing the tendency of the heat to promote side reactions and using an inert stripping gas such as nitrogen to strip out the complexed ligand. A most preferred method, however, to eliminate such side reactions is to provide for the presence of an extraneous excess halide in the decomplexing zone. The halide may be present in the form of a hydrogen halide, e.g., HCl, or as any inorganic halogen salt, e.g., $SnCl_2$, preferably the halogen salt of alkali or alkaline earth metals, e.g., NaCl, KCl, $CaCl_2$, $BaCl_2$, and the like and most preferably as CuCl. The excess halide is believed to shift the equilibrium toward the $AlCl_4^-$ anion and thereby inhibit the residual catalytic activity of the $AlCl_3$ that may be present. By this means the decomplexing reaction can be carried out at atmospheric pressures and normal decomplexing temperatures. Generally, it is only necessary to have sufficient halide present to neutralize the catalytic activity of the aluminum halide. However, at least about 0.01 mole percent extraneous halide based on bimetallic salt should be present, preferably at least about 0.1 mole percent, more preferably about 1 to 10 mole percent.

The form in which the extraneous halide is employed is not critical and the halide can be a solid bed through which the liquid phase complex and aromatic can trickle, or it may be employed as a solid, granular material that is slurried in the liquid phase. In this latter form a decomplexed slurry can be withdrawn from the decomplexing stage. The liquid can easily be separated by solid-liquid separating means such as hydroclone. The clarified liquid of sorbent salt and aromatic can then be recycled to the process while the solid halide is recycled to the decomplexing stage.

Having now described the invention, the following examples will serve to further illustrate the process described herein. However, no limitations are to be implied from these examples, since variations and modifications will be apparent to those skilled in the art.

EXAMPLE 1

1.1 moles of carefully purified CuCl (109 grams) were mixed with 1 mole of purified $AlCl_3$ (133 grams) in an inert nitrogen atmosphere as dry powders. This powder was slowly added with agitation in an inert atmosphere to 2 moles (156 grams) of dry benzene. The mixture was allowed to stir for one hour. The clear, dark liquid was removed from the small quantity of undissolved solids by decantation. The liquid was then treated with anhydrous ethylene gas, and a solid ethylene complex was formed. The solid was separated by filtration, and washed with pentane saturated with ethylene. The solid was dried in a stream of ethylene. The dry solid was then heated in a vacuum, and the ethylene was decomplexed yielding the free $CuAlCl_4$. Elemental analysis of the ethylene complex before decomposition showed:

Calculated (percent): Cu, 22.0; Al, 9.4; Cl, 49.1; C, 16.7; H, 2.8. Found (percent): Cu, 21.0; Al, 9.7; Cl, 53.2; C, 17.1; H, 3.1.

This analysis corresponds to $CuAlCl_4 \cdot 2(C_2H_4)$ and shows a 2:1 complex indicating that the original benzene complex was a 2:1 complex.

EXAMPLE 2

Ethylene recovery 60 ml. (81.2 g.) of the $(toluene)_2 \cdot CuAlCl_4$ complex was placed in a gas bubbler and crude ethylene ($C_2$ feed as normally fed to an ethylene recovery plant) was bubbled through the complex. The ethylene exchanged with the toluene to form the $(ethylene)_2 \cdot CuAlCl_4$ complex and free toluene. The composition and volume of tail gas leaving the absorber were both monitored. After no more ethylene would absorb, the solution was stripped with C.P. ethylene and then the ethylene was recovered by heating the solution to dissociate the ethylene complex. A total of 7.2 liters of ethylene was recovered with an average composition of 99.97% pure ethylene.

| | Composition, mole percent | | |
|---|---|---|---|
| | Ethylene | Ethane | Methane |
| Feed | 40.7 | 8.0 | 51.3 |
| Initial absorption tail gas | 0.05 | 11.6 | 88.4 |
| Final absorption tail gas | 33.8 | 8.2 | 58.0 |
| C.P. ethylene stripping gas | 99.9 | 0.09 | 0.008 |
| Initial stripping tail gas | 99.7 | 0.11 | 0.04 |
| Final stripping tail gas | 99.99 | 0.00 | 0.008 |
| Initial decomplexing | 99.86 | | |
| Middle decomplexing | 99.97 | | |
| Final decomplexing | 99.996 | | |

This example shows that very high purity ethylene can be made from the commercial $C_2^-$ stream by this process and thus the trace acetylene and CO in the feed do not interfere with production of high quality ethylene.

EXAMPLE 3

Ethylene-propylene recovery

An exchange tower much like that shown as 16 in the figure is set up to test the ethylene-propylene separation by exchange. A feed consisting of 50% ethylene-50% propylene is fed to the middle of the tower and $CuAlCl_4 \cdot 2$ toluene complex solvent is fed at the top. A reboiler provided at the bottom of the column regenerates the solvent and provides stripping gas at the bottom of the tower. Dry gas meters are used to meter the amounts of feed gas taken off at the top and bottom of the tower and thus control the material balance of overhead to bottom product. The results show that when the material balance was adjusted to give more than 50% of feed to the overhead, the product compositions are 95% ethylene in the overhead and less than 1% ethylene in the bottoms. This is for room temperature exchange with the reboiler at 100° C. When the material balance is changed to give 45% of the feed overhead, the product composition is >99% ethylene in the overhead and 10% ethylene in the bottoms. These results show that the ethylene-propylene separation by ligand exchange is relatively easy to perform and that by properly controlling material balance, both high purity ethylene and high purity propylene can be made in the same plant.

EXAMPLE 4

Exchange of complexible ligand by more stable complexible ligand (A) Propylene for ethylene.—A solution of 82.5 g. of $CuAlCl_4 \cdot 2$ toluene was treated with pure ethylene to form the $CuAlCl_4 \cdot 2$ ethylene complex. The complex formed went to 80% of the theoretical loading. This complex was then treated with pure propylene vapor at 24° C. The exchange reaction was carried out in a single stage, and represents what might be expected in the bottom section of an exchanger. No reflux fresh sorbent was used to increase ethylene purity.

The initial off-gas from the exchange was 86.7% ethylene and 13.3% propylene. At the end of the exchange, the off-gas was 99.94% propylene and 0.06% ethylene.

The complex was then heated to decomplex the propylene, which was obtained in 99.97% purity and 70.5% loading. This test represents the final exchange reactor and decomplexer of the preferred process scheme.

(B) Ethylene for carbon monoxide.—In a similar experiment, 83 g. of $CuAlCl_4 \cdot 2$ toluene was complexed to 71.5% loaded with pure carbon monoxide. Exchange was carried out with pure ethylene at 24° C. The initial off gas was 90.2% CO and 9.8% ethylene, and the final exchange gas was 99.98% ethylene and 0.02% CO. The complex was decomplexed to yield 99.98% pure ethylene at 80.5% loading. This represents one of the first exchange steps in the preferred process scheme.

(C) Ethylene for acetylene.—In a similar test 86.2 g. of $CuAlCl_4 \cdot 2$ toluene complex was loaded to 72% with pure acetylene. The exchange was carried out with pure ethylene at 24° C. The initial off gas was 82.4% acetylene and 17.6% ethylene, and the final exchange gas was 99.1% ethylene and 0.9% acetylene. The complex was decomplexed to yield 97.5% loaded product of 97.5% pure ethylene. This represents an intermediate exchange step in the preferred process scheme.

(D) Ethylene exchange for commercial impurities in ethylene complex.—In a similar experiment, 81.2 g. of $CuAlCl_4 \cdot 2$ toluene was treated with a typical $C_2^=$ steam cracked commercial feed. The ethylene content of the feed was approximately 40%. The ethylene complex was then treated with pure ethylene to exchange any impurities which might have complexed from the commercial feed (e.g. CO). The initial off gas was 99.8% ethylene and 0.2% CO. The final exchange gas was 99.9+% ethylene and 0.004% CO. The complex was decomplexed to give a product which was 99.9+% pure ethylene.

EXAMPLE 5

Addition of excess halides to reduce side reactions

A series of tests were carried out to show that excess added halides should be present during the decomplexation step to reduce side reactions. In each case, $$CuAlCl_4 \cdot 2$$

(toluene) complex was heated at 280° F. in an atmosphere of propylene to determine the percent side reactions which took place per day.

| Additive: | Percent side reactions/day |
|---|---|
| None | 13 |
| 0.3% HCl | 0.7 |
| 3.7% NaCl | 0.1 |
| 5% CuCl | 0 |

EXAMPLE 6

Ligand exchange

Rapid ligand exchange has been demonstrated for a variety of pairs of complexing ligands. In these experiments the $(toluene)_2 \cdot CuAlCl_4$ complex was treated at room temperature in a gas bubbler with a gas containing another ligand (either ethylene, CO, or acetylene) until the Cu would no longer pick up any of the gaseous ligand. Then a second gas containing a different complexing ligand was used to strip the solution and the exit gas was analyzed by gas chromatography. Finally, when no further changes in composition occurred, the solution was heated to 140° C. to liberate whatever was complexed on the $CuAlCl_4$. This gas was also analyzed by gas chromatography. The results are shown in the following table.

| First complexing ligand | Ethylene | CO | Acetylene |
|---|---|---|---|
| Stripping gas | Propylene | Ethylene | Ethylene. |
| First exit stripping gas | 86.7% $C_3^=$ | 90.1% CO | 82% $C_2^=$ |
| Last exit stripping gas | 99.94% $C_3^=$ | 100% $C_3^=$ | 99.06% $C_2^=$ |
| Decomplexed product | 99.7% $C_3^=$ | 99.9+% $C_2^=$ | {98% $C_2^=$ / 2% $C_2\equiv$} |

This table shows that the first stripping gas analyzed from 82 to 90% content of the ligand which was used to form the original complex even though a different pure ligand was used as the stripping gas. This means that the few seconds needed for the gas to pass through the liquid are enough to get extensive ligand exchange. Furthermore, the very small amount of the original ligand obtained upon decomplexing shows that it was essentially completely removed by stripping with the second ligand.

What is claimed is:

1. A process for separating and recovering at least two complexible ligands contained in a feed stream which comprises contacting the feedstream with a sorbent maintained in the liquid phase, said sorbent comprising cuprous aluminum halide, complexing substantially all of the said complexible ligands contained in the feed stream, contacting the complexed complexible ligand in at least one exchange reaction with a stripping ligand differing from the complexible ligand to be exchanged in said reaction and which forms a more stable complex with the sorbent than at least one of the complexed complexible ligands thereby exchanging the stripping ligand for the said complexed complexible ligand and recovering the exchanged complexible ligands and the ultimate cuprous aluminum halide-stripping ligand containing complex, said complexible ligand and stripping ligand selected from the group consisting of aromatics, olefins, acetylenes, carbon monoxide and mixtures thereof and said contacting steps conducted under substantially anhydrous conditions in the substantial absence of oxygen.

2. The process of claim 1 wherein said sorbent is a $CuAlX_4 \cdot 2$ (aromatic) complex and X is a chlorine or bromine atom.

3. The process of claim 1 wherein the complexible ligands are complexed at temperatures in the range of about −40 to 300° F. and pressures ranging from about 0.5 to 100 atmospheres.

4. The process of claim 1 wherein the ultimate complex is dissociated by heating the complex at temperatures ranging from about 50° F. to 500° F. and pressures ranging from 0.1 to 30 atmospheres.

5. The process of claim 4 wherein the dissociation is carried out in the presence of an extraneous halide.

6. A process for separating and recovering at least two complexible ligands contained in a feed stream and selected from the group consisting of $C_2$–$C_{20}$ monoolefins, $C_4$–$C_{10}$ conjugated diolefins, $C_5$–$C_{10}$ cyclic olefins, $C_2$–$C_6$ acetylenes, carbon monoxide and mixtures thereof which comprises contacting the feedstream with a liquid sorbent comprising cuprous aluminum halide, complexing substantially all of the complexible ligands contained in the feed stream, contacting the complexed complexible ligands in at least one exchange reaction with a stripping ligand differing from the complexible ligand to be exchanged in said reaction and selected from the group consisting of $C_2$–$C_{20}$ monoolefins, $C_4$–$C_{10}$ conjugated diolefins, $C_5$–$C_{10}$ cyclic olefins, $C_2$–$C_6$ acetylenes, carbon monoxide and mixtures thereof, said stripping ligand forming a more stable complex with sorbents than at least one of the complexed complexible ligands thereby exchanging the stripping ligand for the said complexible ligand and recovering the exchanged complexed complexible ligands and an ultimate cuprous aluminum halide-stripping ligand containing complex, said contacting steps conducted under substantantially anhydrous conditions in the substantial absence of oxygen.

7. The process of claim 6 wherein the cuprous aluminum halide is dissolved in a $C_6$–$C_{20}$ aromatic.

8. The process of claim 7 wherein the sorbent has the generic formula $CuAlX4 \cdot 2$(aromatic) and X is selected from the group consisting of chlorine and bromine.

9. The process of claim 8 wherein the aromatic is toluene.

10. The process of claim 6 wherein there are $n$ complexed complexible ligands and $n-1$ stripping ligands are employed.

11. The process of claim 6 wherein the ultimate complex is dissociated by heating in the presence of an extraneous halide selected from the group consisting of hydrogen halide and inorganic metal halides.

12. The process of claim 11 wherein the extraneous halide is cuprous halide.

13. The process of claim 6 wherein ethylene and propylene are complexible ligands contained in the feed stream, contacting the feed stream in a complexing zone with a $CuAlX_4 \cdot 2(C_6$–$C_8$ aromatic) sorbent, thereby forming an ethylene complex, a propylene complex and free aromatic, contacting the complexes with propylene in a stripping zone thereby displacing ethylene, recovering the displaced ethylene, heating the ultimate propylene complex in the presence of the free aromatic to dissociate that complex, recovering the dissociated propylene, and reforming the $CuAlX_4 \cdot 2(C_6-C_8$ aromatic) sorbent.

14. The process of claim 13 wherein the ultimate complex is heated in the presence of CuCl.

15. The process of claim 13 wherein a portion of the recovered ethylene and propylene are recycled to the complexing zone.

16. The process of claim 13 wherein a portion of the recovered propylene is recycled to the stripping zone.

17. The process of claim 13 wherein the reformed $CuAlX_4 \cdot 2(C_6-C_8$ aromatic) is recycled to the complexing zone.

18. The process of claim 13 wherein a portion of the reformed $CuAlX_4 \cdot 2(C_6-C_8$ aromatic) is recycled to the stripping zone.

19. A process for separating and recovering a complexible ligand contained in a feed stream which comprises contacting the feed stream with a sorbent maintained in the liquid phase, said sorbent comprising cuprous aluminum halide, complexing said complexible ligand contained in said feed stream, contacting the complexed complexible ligand in at least one exchange reaction with a stripping ligand differing from the complexible ligand to be exchanged in said reaction and which forms a more stable complex with the sorbent and the complexed complexible ligand thereby exchanging the stripping ligand for the said complexed complexible ligand and recovering the exchanged complexible ligand and an ultimate cuprous aluminum halide-stripping ligand containing complex, said complexible ligand and stripping ligand each selected from the group consisting of aromatics, olefins, acetylenes, carbon monoxide and mixtures thereof and said contacting step conducted under substantially anhydrous conditions in the substantial absence of oxygen.

20. The process of claim 19 wherein said sorbent is a $CuAlX_4 \cdot 2$ (aromatic) complex and X is a chlorine or bromine atom.

21. The process of claim 19 wherein the complexible ligand is complexed at temperatures in the range of about −40 to 300° F. and at pressures ranging from about 0.5 to 100 atmospheres.

22. The process of claim 19 wherein said cuprous aluminum halide is selected from the group consisting of cuprous aluminum chlorides and cuprous aluminum bromides.

23. The process of claim 22 wherein said complexible ligands and stripping ligands are each selected from the group consisting of $C_2-C_{20}$ monoolefins, $C_4-C_{10}$ conjugated diolefins, $C_5-C_{10}$ cyclic olefins, $C_2-C_6$ acetylenes, $C_6-C_{20}$ aromatics, polyolefins, cumulative olefins, and carbon monoxide.

24. The process of claim 19 wherein said sorbent is a $CuAlX_4 \cdot 2(C_6-C_{20})$ complex and X is selected from the group consisting of chlorine and bromine atoms.

25. The process of claim 23 wherein the sorbent is a $CuAlX_4 \cdot 2(C_6-C_9$ aromatic) complex and X is selected from the group consisting of chlorine and bromine atoms.

26. The process of claim 23 wherein the sorbent is a $CuAlX_4 \cdot 2$(toluene) complex and X is selected from the group consisting of chlorine and bromine atoms.

27. The process of claim 24 wherein the complexible ligands and stripping ligands are selected from the group consisting of $C_2-C_{10}$ monoolefins, $C_2-C_4$ acetylenes, $C_6-C_9$ aromatics and carbon monoxide.

28. The process of claim 27 wherein said complexing and ligand exchange reactions are conducted at a temperature ranging from 0 to 150° F. at a pressure varying from 1 to 200 atmospheres.

29. The process of claim 22 wherein said complexible ligand and stripping ligand are selected from the group consisting of ethylene and propylene.

30. The process of claim 1 wherein said cuprous aluminum halide is selected from the group consisting of cuprous aluminum chloride and cuprous aluminum bromide.

31. The process of claim 30 wherein said complexible ligands and stripping ligands are selected from the group consisting of $C_2-C_{20}$ monoolefins, $C_4-C_{10}$ conjugated diolefins, $C_5-C_{10}$ cyclic olefins, $C_2-C_6$ acetylenes, $C_6-C_{20}$ aromatics, polyolefins, cumulative olefins, and carbon monoxide.

32. The process of claim 31 wherein said sorbent is a $CuAlX_4 \cdot 2(C_6-C_{20}$ aromatic) complex and X is selected from the group consisting of chlorine and bromine atoms.

33. The process of claim 31 wherein said sorbent is a $CuAlX_4 \cdot 2(C_6-C_9$ aromatic) complex and X is selected form the group consisting of chlorine and bromine atoms.

34. The process of claim 33 wherein said complexible ligand and stripping ligands are selected from the group consisting of $C_2-C_{10}$ monoolefins, $C_4-C_6$ conjugated diolefins, $C_2-C_4$ acetylenes, $C_6-C_9$ aromatics and carbon monoxide.

35. The process of claim 6 wherein said cuprous aluminum halide is selected from the group consisting of cuprous aluminum chloride and cuprous aluminum bromide.

36. The process of claim 8 wherein said complexible ligands and stripping ligands are selected from the group consisting of $C_2-C_5$ monoolefins, $C_2-C_4$ acetylenes and carbon monoxide.

37. The process of claim 36 wherein said complexing and ligand exchange reactions are conducted at a temperature ranging from 0 to 150° F. at a pressure varying from 1 to 200 atmospheres.

38. The process of claim 13 wherein said cuprous aluminum halide is selected from the group consisting of cuprous aluminum chloride and cuprous aluminum bromide.

39. The process of claim 38 wherein said complexing and ligand exchange reactions are conducted at a temperature varying from 0 to 150° F. at a pressure ranging from 1 to 200 atmospheres.

References Cited

UNITED STATES PATENTS

| | | | |
|---|---|---|---|
| 2,913,505 | 11/1959 | Van Raay et al. | 260—677 |
| 3,218,366 | 11/1965 | Baxter | 260—677 |
| 3,265,591 | 8/1966 | Halliwell | 203—33 |
| 3,410,924 | 11/1968 | Fasce | 260—677 |

OTHER REFERENCES

Amma, J.A.C.S., vol. 85, pp. 40–46 (1963), Twiner et al.

Chemical Abstracts, vol. 28, column 1591 [9], 1592 [1], and 6119 [5] (1934), pp. 260–677.

DELBERT E. GANTZ, Primary Examiner

G. E. SCHMITKONS, Assistant Examiner

U.S. Cl. X.R.

23—204, 205; 260—666, 674, 678, 681.5